US012638743B2

(12) United States Patent
Dionne et al.

(10) Patent No.: US 12,638,743 B2
(45) Date of Patent: May 26, 2026

(54) ELECTRICALLY-RECONFIGURABLE HIGH QUALITY FACTOR METASURFACES FOR DYNAMIC WAVEFRONT SHAPING

(71) Applicant: The Board of Trustees of the Leland Stanford Junior University, Stanford, CA (US)

(72) Inventors: Jennifer A. Dionne, Menlo Park, CA (US); Mark Lawrence, Saint Louis, MO (US); David Russell Barton, III, Somerville, MA (US); Elissa Klopfer, Stanford, CA (US); Sahil Dagli, Stanford, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 374 days.

(21) Appl. No.: 18/025,887

(22) PCT Filed: Sep. 15, 2021

(86) PCT No.: PCT/US2021/050493
§ 371 (c)(1),
(2) Date: Mar. 11, 2023

(87) PCT Pub. No.: WO2022/060858
PCT Pub. Date: Mar. 24, 2022

(65) Prior Publication Data
US 2023/0350266 A1     Nov. 2, 2023

Related U.S. Application Data

(60) Provisional application No. 63/175,970, filed on Apr. 16, 2021, provisional application No. 63/078,579, filed on Sep. 15, 2020.

(51) Int. Cl.
*G02F 1/29* (2006.01)

(52) U.S. Cl.
CPC ............ *G02F 1/29* (2013.01); *G02F 2202/30* (2013.01)

(58) Field of Classification Search
CPC ............................... G02F 1/29; G02F 2202/30
(Continued)

(56) References Cited

U.S. PATENT DOCUMENTS

2017/0097558 A1    4/2017  Belkin
2018/0216797 A1    8/2018  Khorasaninejad et al.
(Continued)

FOREIGN PATENT DOCUMENTS

KR        20200099362        8/2020

OTHER PUBLICATIONS

Klopfer et al., "Dynamic Focusing with High-Quality-Factor Metalenses", 2020, Nano Letters v20 5127-5132.
(Continued)

*Primary Examiner* — Balram T Parbadia
*Assistant Examiner* — Grant A Gagnon
(74) *Attorney, Agent, or Firm* — LUMEN PATENT FIRM

(57) ABSTRACT

We utilize high-quality-factor (high-Q) metasurfaces patterned either in or adjacent to electro-optical or thermo-optical materials such as lithium niobate, barium titanate, or thermally-sensitive polymers. The metasurface includes nanoantennas that act as dipole emitters; the particular structure and arrangement of nanoantennas can steer light to particular directions or focus light, The electromagnetic metasurface supports one or more guided mode resonances. The metasurface also includes a perturbation superposed on the metasurface features and configured to couple free-space radiation to the guided mode resonances.

10 Claims, 17 Drawing Sheets

(58) Field of Classification Search
USPC .......................................................... 359/315
See application file for complete search history.

(56) References Cited

U.S. PATENT DOCUMENTS

| | | |
|---|---|---|
| 2019/0033682 A1 | 1/2019 | Kafaie Shirmanesh et al. |
| 2020/0227632 A1 | 7/2020 | Kim |
| 2021/0132255 A1 | 5/2021 | Barton, III |

OTHER PUBLICATIONS

Komar et al., "Electrically tunable all-dielectric optical metasurfaces based on liquid crystals", 2017, APL 110 071109.
Sun et al. "Efficient visible light modulation based on electrically tunable all dielectric metasurfaces embedded in thin-layer nematic liquid crystals", 2019, Scientific Reports 9:8673.

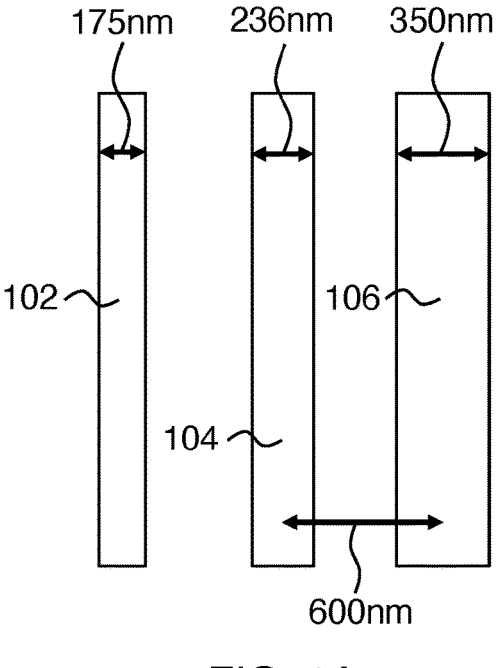
FIG. 1A
FIG. 1B
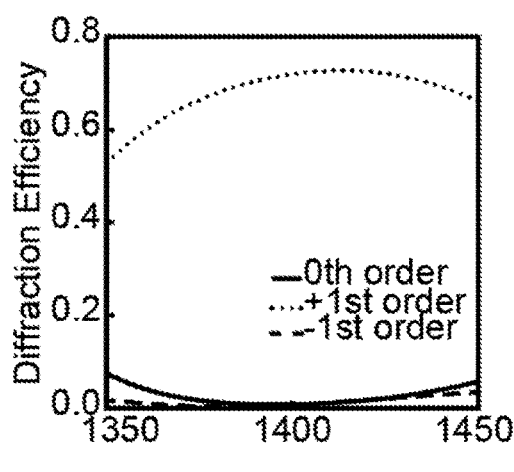
FIG. 1C
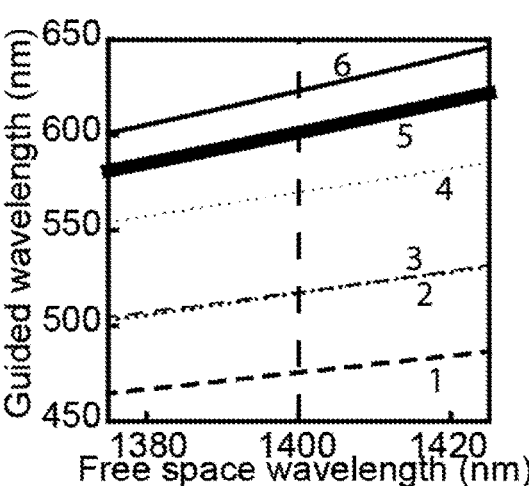
FIG. 1D

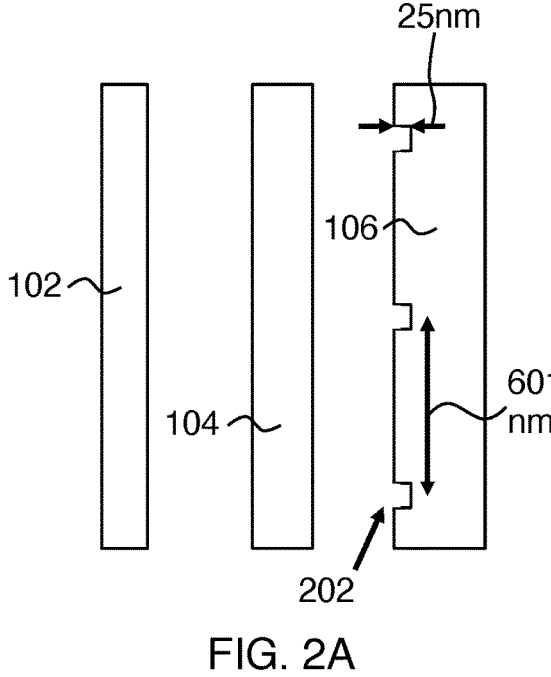
FIG. 2A
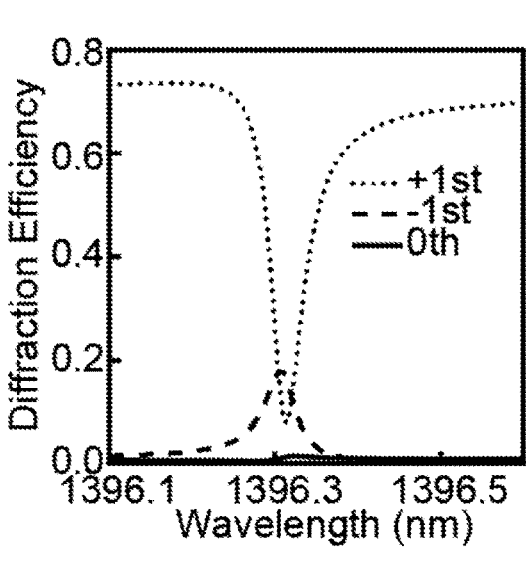
FIG. 2B
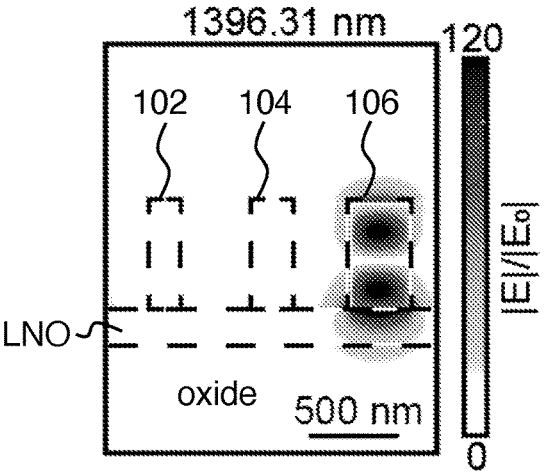
FIG. 2C
FIG. 2D

504

506

502

508

$V_1$
$V_2$
$V_3$
$V_4$
$V_5$ $V_1$
$V_2$
$V_3$ 514  516

510

$10^\circ$ 50 nm TCO
220 nm Si 100 nm LNO
50 nm TCO 610 nm SiO₂

ELECTRICALLY-RECONFIGURABLE HIGH QUALITY FACTOR METASURFACES FOR DYNAMIC WAVEFRONT SHAPING

FIELD OF THE INVENTION

This invention relates to electrically reconfigurable high-Q metasurfaces.

BACKGROUND

Mobile sensing technologies spanning artificial reality/virtual reality, autonomous vehicles, gesture recognition, and high speed communications require efficient control of light beams. However, these supposedly "mobile" technologies generally are comprised of bulky optical elements, adding significant weight and size to these platforms. The control of illumination and collection directions are also often mechanically actuated, reducing operating lifetime, increasing device size, and limiting the range of conditions under which such devices can operate. Accordingly, it would be an advance in the art to provide improved electrically reconfigurable optical devices.

SUMMARY

We have developed ultra-thin (micron-scale-thick) optical chips that dynamically modulate the intensity and direction of transmitted or reflected light using an applied electric field. This development of compact, electrically-tunable beam-steerers addresses a critical challenge in realizing compact, lightweight LIDAR, LIFI, and other imaging and sensing platforms.

We utilize high-quality-factor (high-Q) metasurfaces patterned either in or adjacent to electro-optical or thermo-optical materials such as lithium niobate, barium titanate, or thermally-sensitive polymers. The metasurface includes subwavelength nanoantennas that act as dipole emitters; the particular structure and arrangement of nanoantennas can steer light to particular directions or focus light. The electromagnetic metasurface supports one or more in-plane guided mode resonances. The metasurface also includes a perturbation superposed on the metasurface features and configured to couple free-space radiation to one or more of the in-plane guided mode resonances.

Having an ultranarrow linewidth, our high Q resonance is incredibly sensitive to small changes in refractive index. A change in the refractive index of the electro-optical or thermo-optical materials with an applied bias shifts this high-Q resonance. Therefore, the combination of a high-Q resonance and electro-optic or thermo-optic materials enables efficient modulation of metasurface optical transfer function (i.e., beamsteering or focusing) with a low operating voltage.

In some exemplary embodiments, the application of a modest DC electric field across our metasurfaces can modulate the intensity of the diffracted beam at the designed wavelength. For example, our devices can modulate transmission of light to a particular direction from over 70% to less than 10% with applied voltages of 10 s of Volts; a reduced voltage budget is possible with optimized device dimensions.

Depending on the desired output optical transfer function, the bias can be applied across the entire metasurface, or across individual metasurface constituents (i.e., with contacts across the individual nanoantennas comprising the metasurface). Pixelated arrays of such metasurfaces, each designed for a particular beamsteering direction, could also be used for full-view sensing devices (i.e. those which could perform optical ranging with a wide field of view).

Our current devices operate in transmission (i.e. an incident laser will transmit through the metasurface and be steered to a designed direction). However, the same design principles can be applied for resonant and tunable reflectarrays. We also note that our current device design uses electro-optic materials. However, electric fields can also act as thermal sources to shift resonant frequencies or enable fully reconfigurable metasurfaces with thermo-optic materials.

We have designed structures that operate in the visible and near infrared. The light source also need not be integrated on chip, though the structures could also be patterned on top of a light source. The entire source plus modulatable metasurface can be compactly integrated into mobile sensor platforms, with a total device thickness of less than a few microns.

Our results can be applied to technologies spanning LIDAR for sensing and locomotion, deployable mobile sensors, wearable sensors, virtual and augmented reality, and other remote sensing and optical ranging applications.

Significant advantages are provided. Commercial solutions to dynamic optical applications, such as LIDAR and AR/VR, rely on sophisticated multicomponent assemblies. Various time-of-flight methods in production rely on mapping via mechanical scanning or MEMS; these methods suffer from poor scalability, high cost and frequent recalibration. Solid-state approaches—such as those based on camera lens systems or optical phased arrays (i.e., Analogue Photonics) face key challenges in terms of design complexity, power consumption, and cost; the power of the source is also a challenge for on-chip systems.

Our solid-state platform based on high-Q metasurfaces enables high reconfigurability in a compact free-space illuminated chip platform; it promises to be more efficient than existing solid-state approaches. Additionally, it does not require on-chip light sources, offering improved signal-to-noise ratios for high-resolution, long-range mapping. We note that other electrically-reconfigurable metasurface designs with comparable dimensions (such as those based on epsilon-near-zero materials or liquid crystals) do not possess a high quality factor at this length scale; they also tend to absorb a large amount of the incident light or weakly modulate light with inefficient beam-steering.

Our scheme provides the first route to highly efficient and compact modulatable phase gradient metasurfaces suitable for dynamic ranging applications (>50% incident light into the desired diffraction order, minimal applied electric fields of ~10V, with <1V operation possible).

Individually gating the nanoantennas can be done to separately control them. This would enable more flexible and reconfigurable device designs, including beam steerers and lenses.

GMR (Guided Mode Resonance) nanoantennas can be placed on a metal ground plane and then each antenna acts as an independent phase pixel. By adjusting the indices of each bar separately, a single device can steer light to arbitrary angles. The index needed is also very small because of the high Q. This also includes a design trick to drop the spacing between nanoantennas giving a larger range of steering angles and finer angle tunability. In these simulations the electrical biasing mechanism isn't modeled. Instead, the index is adjusted directly. But this design could easily be combined with electro-optic or thermo-optic tunable as described elsewhere.

Another noteworthy aspect of the present work is providing fully reconfigurable devices where each individual 'pixel', defined as an individual high-Q nanoantenna within the array, of a device can be independently tuned by shifting its high-Q resonance with an electrical bias. Such independent biasing of pixels greatly increases the versatility of the resulting multi-pixel metasurface devices. Further degrees of flexibility, such as additional angle control or fully 2-dimensional light manipulation, could be achieved by patterning multiple metasurfaces, each metasurface having its own array of controllable pixels, to construct multiplexed devices.

BRIEF DESCRIPTION OF THE DRAWINGS

FIG. 1A shows a first exemplary unperturbed metasurface.

FIGS. 1B-E show simulation results for the example of FIG. 1A.

FIG. 2A shows a resonant metasurface obtained by perturbing the metasurface of FIG. 1A FIGS. 2B-D show simulation results for the example of FIG. 2A.

FIG. 5A shows another example of beam steering.

FIGS. 5B-C are end and top views of the example of FIG. 5A.

FIGS. 8H, 8i, 8J show results for the biasing configuration of FIG. 8A with a 5-element phase gradient.

4

Figure 9:
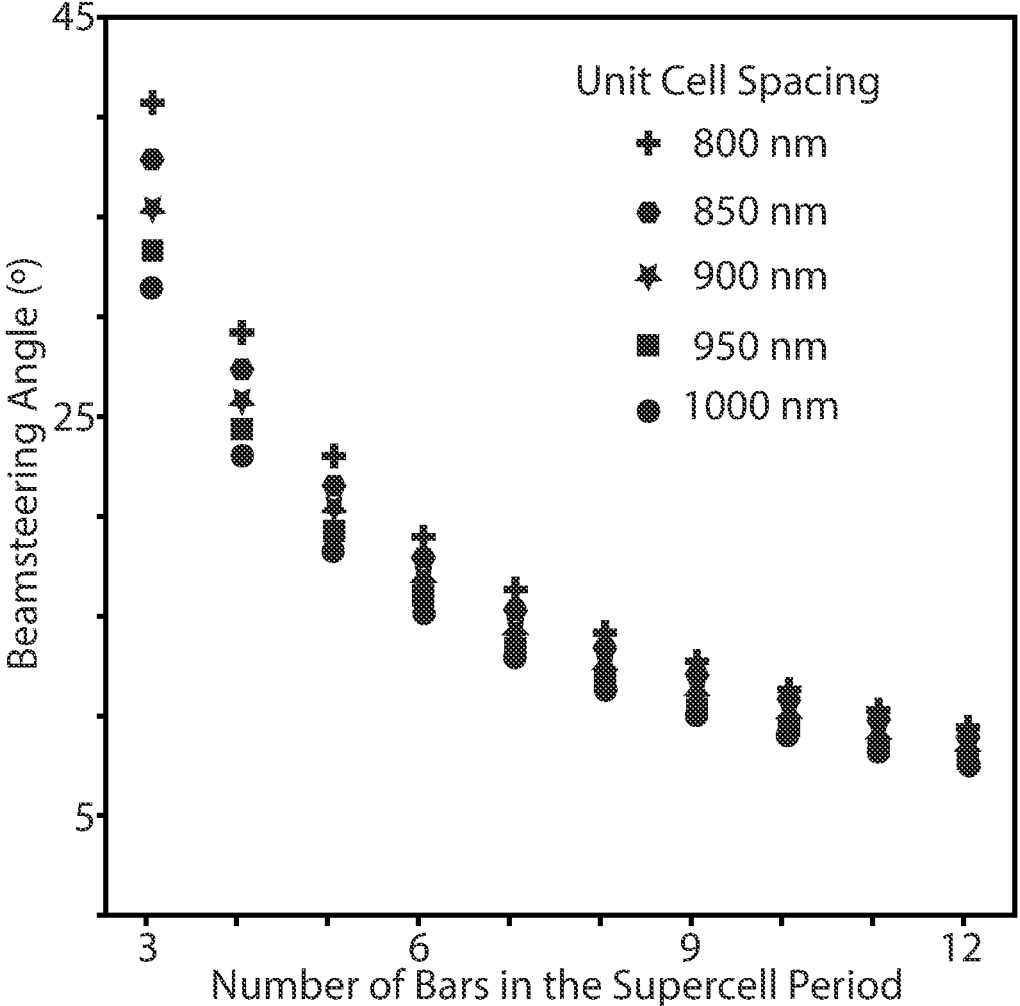

FIG. 9 shows the ability of a resonant metasurface to access various beam steering angles by varying unit cell spacing and the number of bars in a supercell period.

DETAILED DESCRIPTION

A) General Principles

An exemplary embodiment of the invention is an apparatus including an electromagnetic metasurface having two or more waveguides disposed on a surface. For example, waveguides 102, 104, 106 on FIG. 1A, which is a top view. See also FIG. 5A where one of the waveguides 510 is shown disposed on a surface of a substrate. Each of the two or more waveguides supports one or more guided modes (e.g., the mode dispersion plots of FIG. 1D). Each of the two or more waveguides has a corresponding longitudinal perturbation (i.e. a perturbation along the length of the waveguide), whereby at least one guided mode resonance is supported in each of the two or more waveguides. Examples of such perturbations include 202 on FIG. 2A, 402 on FIG. 4A and 512 on FIG. 5C. Free-space radiation is coupled to a selected two or more of the guided mode resonances (GMR) by the longitudinal perturbations of the two or more waveguides. For example, the GMR can be selected by appropriately choosing the periodicity of the perturbation as described below. The selected two or more of the guided mode resonances are tunable according to at least one tuning input, whereby a free-space response provided by the electromagnetic metasurface is tunable, as schematically shown on FIG. 5A. This response can be a near-field response or a far-field response.

The at least one tuning input can include an independent tuning input for each of the two or more waveguides.

The apparatus can further include at least one tuning element, where the electromagnetic metasurface is disposed on or embedded within the at least one tuning element, and wherein the at least one tuning input varies a physical property of the at least one tuning element. In the examples below, the electromagnetic metasurface is disposed on a lithium niobate (LNO) substrate, and the electro-optic effect in LNO provides the tuning, where an applied electric field to the LNO changes its refractive indices.

Alternatively, the tuning input can vary physical properties of the longitudinal perturbations and/or physical properties of the waveguides. For example if the waveguides of the electromagnetic metasurface were fabricated in an electrooptic material (e.g. LNO), then the waveguide itself would be tunable. Similarly, if the longitudinal perturbation took the form of inclusions of electrooptic material, the perturbation would be tunable.

The selected two or more of the guided mode resonances preferably each have a quality factor of 100 or more.

Practice of the invention does not depend critically on details of the surface the metasurface waveguides are disposed on. Suitable surfaces include, but are not limited to: planar surfaces, curved surfaces, and surfaces on flexible materials.

Practice of the invention also does not depend critically on the free-space response that is implemented. Possible free spaces responses include, but are not limited to: beam steering, focusing, phase modulation, amplitude modulation, spatial light modulation, and amplitude and phase modulation. The free space response can be provided as a reflection response or as a transmission response.

An operating wavelength of the electromagnetic metasurface is preferably in a range from 400 nm to 2000 nm. Preferably, at least one of the longitudinal perturbations is periodic.

B) Example 1—Tunable High-Q Phase Gradient Metasurfaces

Optical technologies spanning light detection and ranging (LIDAR), augmented and virtual reality (AR/VR), and light fidelity (LiFi) rely on generating or sensing wavefronts of light in a deterministic, controllable manner. Widespread adoption of these technologies requires high efficiency, large fields of view, and rapid modulation or tuning of the device response. Conventional spatial light modulators, which rely on mechanically actuated components or electrically tuned liquid crystals, can struggle to simultaneously satisfy each of these criteria. For example, mechanical modulation methods with MEMS devices exhibit a large dynamic range but suffer from slower operating speeds, stiction, and limited applicability when space and weight are constrained. Correspondingly, liquid crystal-based spatial light modulators are lightweight and fast, but pixel sizes span several micrometers, yielding limited resolution and field of view. Alternative approaches are needed to enable solid-state, high-resolution, and rapidly reconfigurable optical devices.

Modern developments in nanophotonics have achieved significant scaling of optical components while maintaining high efficiency. Metasurface lenses, beamsteerers, holograms, and other wavefront shaping devices promise to replace bulk optics with nanoantennas. Each antenna is designed to impart a specific amplitude, phase, and polarization to transmitted or reflected light; spatial variation of each antenna allows for complex operations. The sub-wavelength thickness of metasurfaces makes them particularly amenable for mobile devices. However, dynamic modulation of the optical transfer function is necessary for display and detector technologies.

Electrical modulation is a particularly attractive route for reconfigurable devices, promising dense integration and manufacturability similar to conventional electronic devices. However, the refractive index, a key parameter in metasurface design, weakly changes with an applied electric field. Conventional Pockels cells operate with millimeter path lengths, inconsistent with subwavelength antenna design. Other methods such as Stark tuning, phase change materials, carrier effects in semiconductors, epsilon-near-zero plasmonic devices, and others can increase the effective index change, but face tradeoffs in efficiency and tunability. A design methodology that produces high-efficiency (>50%), high-contrast, and high-resolution optical devices with modest electric fields is an area of active research within the metasurface community.

Here, we design highly resonant, electro-optic metasurfaces based on Si-on-Lithium Niobate (LiNbO$_3$, LNO) for efficient and dynamic electrical modulation of diffraction, without sacrificing the subwave-length size of the tuning elements. High-quality factor (high-Q) phase gradient metasurfaces create narrow-band diffractive responses in the far field and increases the photon lifetime in the near-field, desirable attributes for nonlinear and reconfigurable devices. First, we show how the beamsteering response at the design wavelength can be modulated with an applied bias. Next, we show full-field simulations for a metasurface beam splitter device, where an applied voltage between two contacts is used to turn on and off the beamsplitting response. This work provides a framework for high-efficiency metasurfaces with reasonable voltages, an enabling technology for deployable sensor arrays and wavefront shaping devices.

Lithium Niobate (LNO) possesses a large electro-optic coefficient. For an applied electric field polarized along the optical axis of the LNO (here, x-cut), the permittivity changes as $$\Delta\epsilon_{xx} = -r_{33}n_e^4 E_x \tag{B1}$$

$$\Delta\epsilon_{zz} = \Delta\epsilon_{yy} = -r_{13}n_0^4 E_x \tag{B2}$$

Here, the change in permittivity is directly related to both the electro-optic coefficient and the strength of the DC electric field along that direction. While $r_{33}$ ($\approx$31 pm/V) and $r_{13}$ ($\approx$9 pm/V) are stronger in LNO than other typical electro-optic materials, the associated permittivity change is still small. For example, with a uniform x-polarized electric field with the strength of $E_x$ 1V/$\mu$m, the largest change is $\Delta\epsilon$$\approx$7*10$^{-4}$. To overcome the weak modulation associated with this, the electro-optic effect is typically magnified by highly resonant structures, as pioneered by the on-chip photonics community. Here, a reasonable voltage of order 10 V shifts the resonant frequency the same order as the linewidth, leading to a significant (>10 dB) change in transmission.

One of the simplest yet most fundamental phase gradient elements is a beamsteerer, which re-directs light to a pre-defined direction. A linear phase profile that spans 2$\pi$ within a period p will re-direct light according to $$\theta_t = \arcsin\left(\frac{n_i}{n_t}\sin(\theta_i) + \frac{\lambda}{n_t p}\right) \tag{B3}$$

Here, p is the supercell period, $\lambda$ is the incident wavelength, $n_i$ ($n_t$) is the refractive index of the incident (transmitted) medium, and $\theta_i$ ($\theta_t$) is the incident (transmitted) angle relative to the metasurface normal. Using this metasurface design method, the period is subdivided equally into n metasurface elements that approximate the phase gradient as n blocks of the exiting phase. The designs here are based on commercially available thin-film Lithium Niobate wafers, with the addition of deposited or wafer-bonded Silicon on top. We first consider a beamsteering metasurface whose unit cell is composed of three 600 nm tall Silicon nanobars sitting on a 200-nm-thick layer of Lithium Niobate on an oxide substrate. The nanobar center-to-center difference is 600 nm and designed around a free-space wavelength of 1400 nm. First, we sweep the width of the bar using full-field simulations (COMSOL Multiphysics) using experimentally retrieved refractive indices for LNO. FIG. 1A shows a top view of the unit cell of the finalized metasurface. Here 102, 104, 106 are the nanobars as described above. FIG. 1B shows the transmitted amplitude and phase exiting the metasurface as a function of the element width (at $\lambda$=1400 nm). We achieve the 2$\pi$ phase while maintaining high transmittance with this design structure due to the overlap of electric and magnetic dipolar modes. Requiring three elements that differ in the exiting phase by 2n/3, we choose widths of 175 nm, 236 nm, and 350 nm.

Next, we simulate the beamsteering properties by creating a periodic supercell of the three bars. FIG. 1C shows the diffraction efficiency of the allowed orders within 50 nm of the design wavelength. An efficiency approaching 70% transmittance is observed in the designed 1 diffraction order ($\theta_t=51°$), while less than 10% diffracts into either the 0th or 1st diffraction orders within the entire range.

Figure 1E:
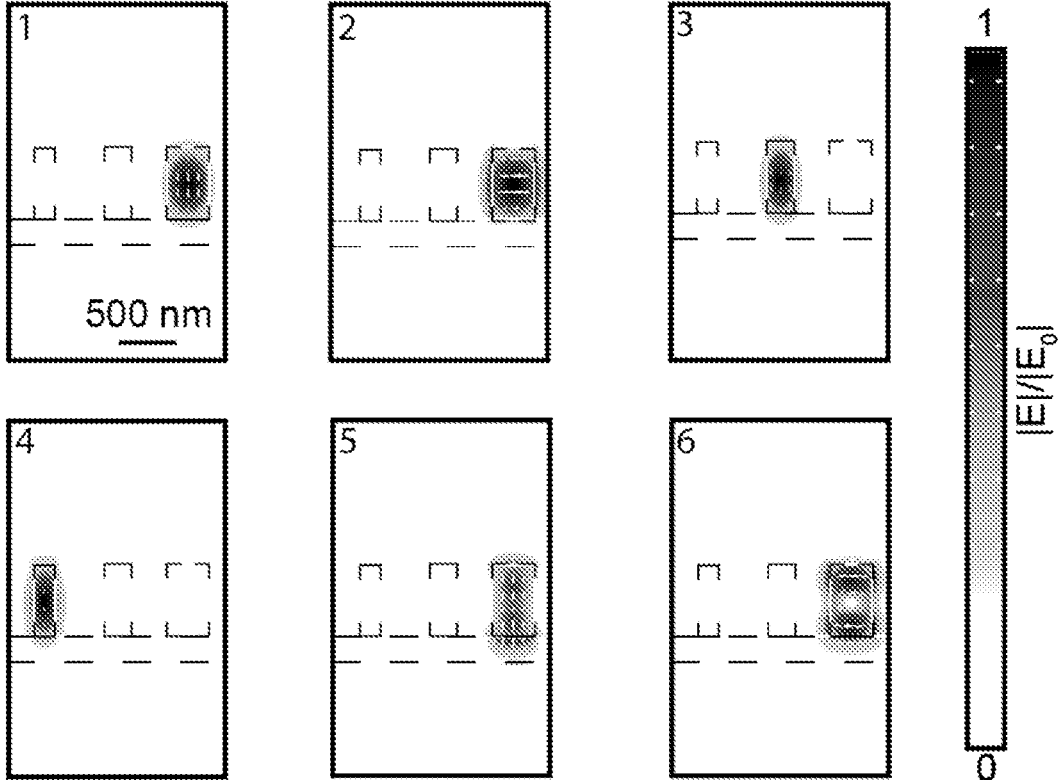

In order to generate a high Q, we consider the in-plane guided modes supported by the metasurface elements. The index contrast between Silicon and the sub/superstrate allows the nanobars to act as waveguides. FIG. 1D shows the guided mode dispersion of the metasurface near 1400 nm, with the lowest six modes shown. Perturbations with periodicity matching the guided mode wavelength selectively couple to these modes. Recent experimental work has demonstrated that phase gradient elements with translational invariance along one direction can be used as high-Q dipolar resonators for wavefront shaping. Here, coupling to a guided mode forms a guided mode resonance in the diffraction spectrum. The Q and the phase gradient response can be tuned based on the perturbation geometry, symmetry, and element used in the design and can exceed thousands. FIG. 1E shows the six lowest energy guided modes in this structure. As seen, the modes are generally confined within individual nanoantennas and are horizontally or vertically polarized. As the guided wavelength increases, higher order modes begin to appear. For our electro-optic application, modes that leak into the LNO are most desirable. For this reason, we choose mode 5, a higher order, vertically polarized mode in the largest bar, to actively modulate the diffraction.

To operate near 1400 nm, we choose a period A of 601 nm, slightly higher than the theoretical value due to the perturbation size. FIG. 2A shows a top-view schematic of the geometry used here. Here perturbation 202 has a periodicity of 601 nm and the perturbation feature is a rectangular section (25 nm by 100 nm) removed from the Silicon. We plot the high-Q diffraction features of our metasurface in FIG. 2B. We observe a Lorentzian-like resonance in the 1st diffracted order with an extracted quality factor of ~31,000 at 1396.3 nm. The transmitted intensity into the 1st order varies from approximately 70% to 7% ($\approx$10 dB) across the resonance. We also observe a Lorentzian-like increase in the diffraction efficiency to the 1st order on resonance and a small, Fano-like feature in the 0th order. We confirm the high-Q nature of the mode within the largest bar by plotting the near-field electric field enhancement in FIG. 2C. Here, the cross section shows field enhancements approaching 120 times within the silicon nanoantenna and mode shape matching the one selected from FIG. 1E. Importantly, a large portion of the electric field penetrates into the LNO region.

We demonstrate the reconfigurability of this metasurface platform by applying an electric field in the LNO layer. We simulate an infinitely periodic system with a uniform x-polarized electric field within the lithium niobate layer and compute the diffraction through the structure at 1396.31 nm. The electric field changes the refractive index of the LNO, shifting the mode resonant frequency. FIG. 2D shows the diffraction efficiency of $\lambda$=1396.31 nm light as the applied electric field is varied from −15 V/$\mu$m to 10 V/$\mu$m. Here, the diffraction efficiency into the 1st order changes by approximately an order of magnitude within this range. This result shows that the electro-optic effect can sweep out the entire range of the high-Q resonance within reasonable applied fields.

From plots of the Ex component of the optical field as a function of applied DC bias, the following features were observed. At a uniform applied field of −15 V/$\mu$m, we see a majority of diffraction goes into the 1st order, acting as a beamsteering metasurface. As the electric field changes to −2 V/$\mu$m, the 1st diffraction efficiency drops significantly, showing efficient modulation of this beamsteering structure.

We also observe an increase in the −1st diffraction order, with equal diffraction into both orders with an efficiency of 18% each. This applied field, therefore, converts the device from a high-efficiency beamsteerer (70% absolute efficiency into the 1st order) to a lower-efficiency beam splitter (36% efficiency). Further modification of the perturbation geometry can potentially improve the overall efficiency. Finally, the +1st order dominates at 0.6 V/$\mu$m. These results show that the broad tunability enabled by high quality factor resonances in the diffraction spectrum of phase gradient metasurfaces and that efficient electro-optic modulation of particular diffraction orders can be designed.

Having demonstrated that an applied electric field can actively modulate the resonant diffraction from our metasurfaces, we now show the general applicability of this design. Using fully coupled electrostatic and electromagnetic simulations, we show the capability for dynamic beamsplitting. For our nanoscale beam splitter, we adapt one of the simpler design methodologies: two repeating unit cells radiate n out of phase with each other. The subwavelength periodicity means that the 0th order is canceled out, meaning that light evenly diffracts into the +1st and −1st orders.

Figure 3A:
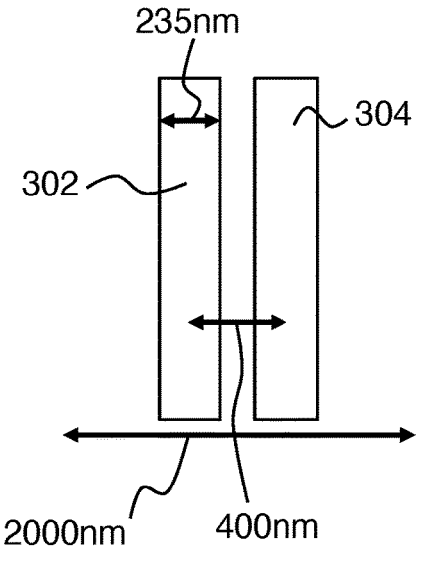
FIG. 3A shows a second exemplary unperturbed metasurface.
Figure 3B:
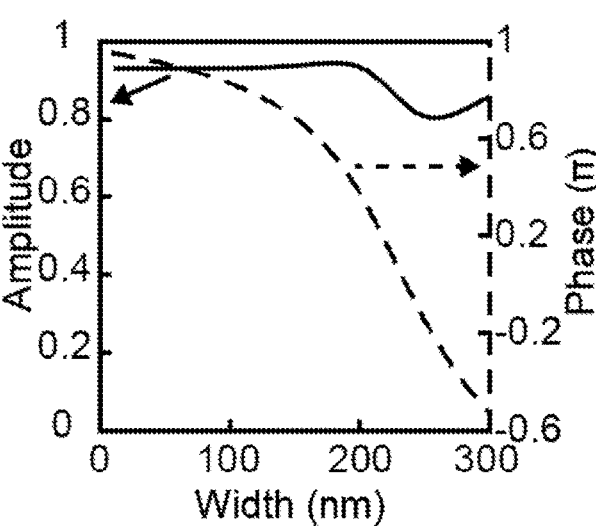
FIGS. 3B-E show simulation results for the example of FIG. 3A.
Figure 3C:
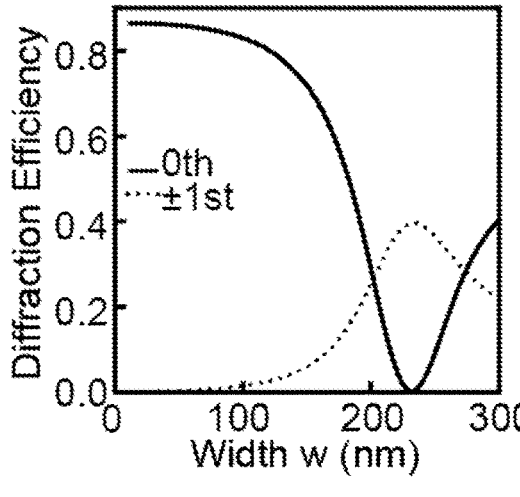

We design our metasurfaces with a region with no metasurface element (the blank regions), while the other element should radiate with a n phase difference relative to the blank area at 1400 nm. A schematic of the unit cell is shown in FIG. 3A. Here, the phase gradient element is two silicon bars 302, 304 with the same top width and a center-to-center difference of 400 nm. FIG. 3B shows the phase variation as a function of bar top width. FIG. 3C shows the beamsplitting efficiency as a function of top width for the entire supercell at 1400 nm. A top width of 235 nm maximizes the beam splitter efficiency.

Figure 3D:
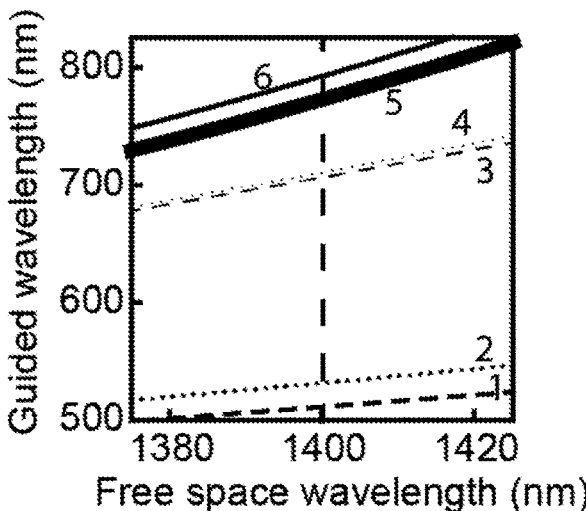
Figure 3E:
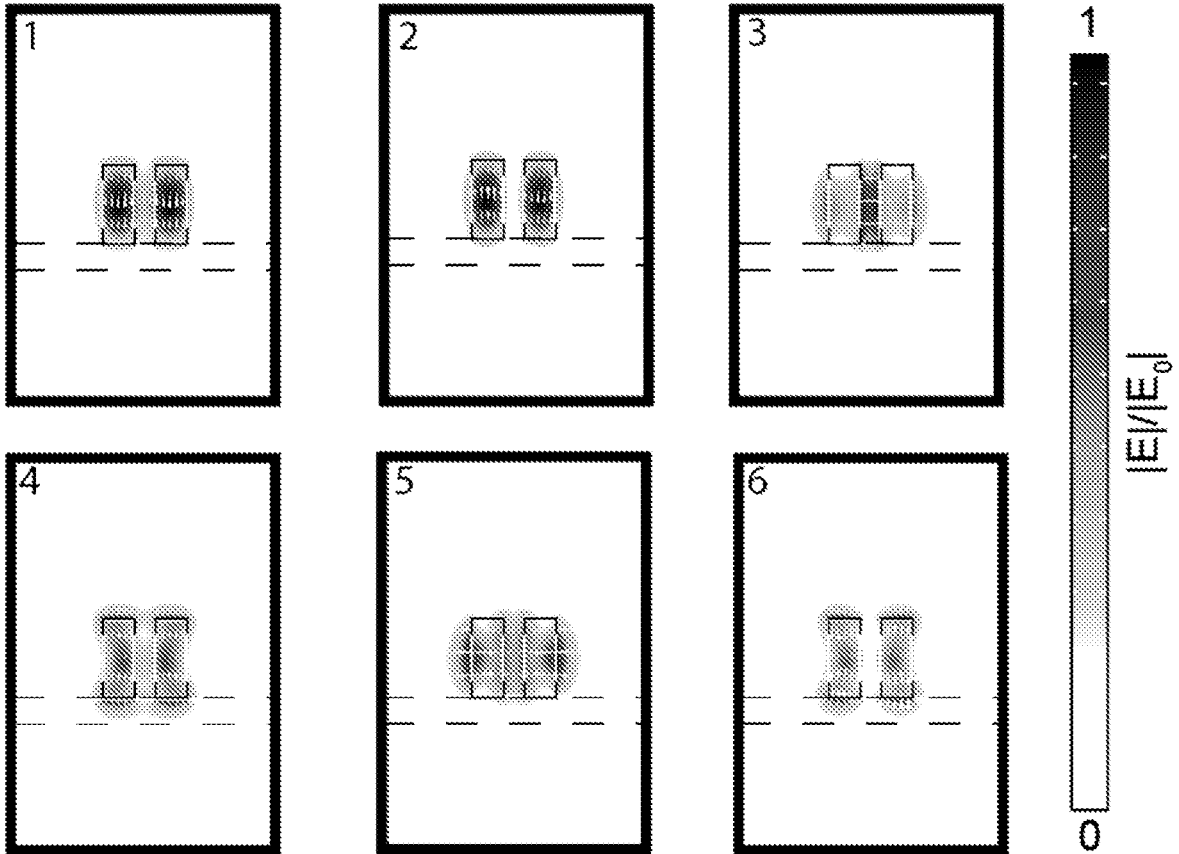

Next, we compute the guided mode dispersion for the bar system near 1400 nm in FIG. 3D. Because the unit cell is composed of two identical and closely spaced bars, the modes of each bar couple, leading to symmetric and antisymmetric combinations for each polarization type, as visualized in FIG. 3E. FIG. 3E displays the electric field distributions for the six lowest order modes, showing that the modes are indeed equally distributed between the bars. Like in the beamsteering metasurfaces, we additionally find that a higher-order, vertically polarized mode leaks more light into the lithium niobate region. We choose a perturbation period of 710 nm to couple into this mode.

Figure 4A:
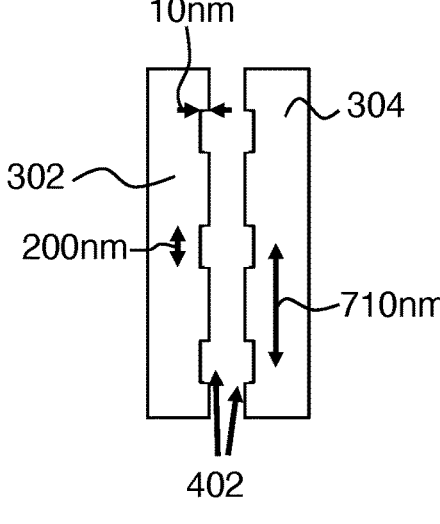
FIG. 4A shows a resonant metasurface obtained by perturbing the metasurface of FIG. 3A FIGS. 4B-D show simulation results for the example of FIG. 4A.
Figure 4B:
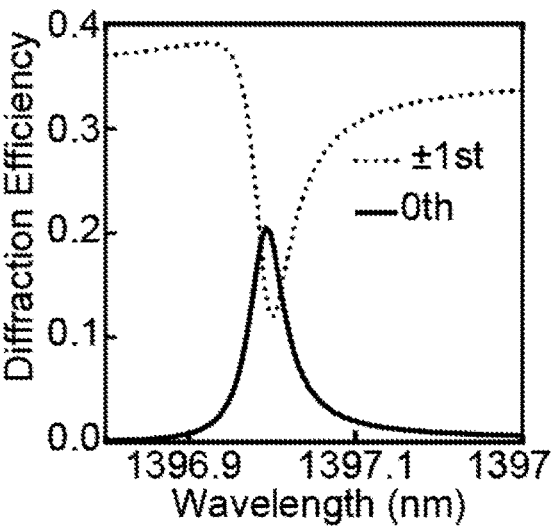
FIG. 4E shows an example of beam steering.
Figure 4C:
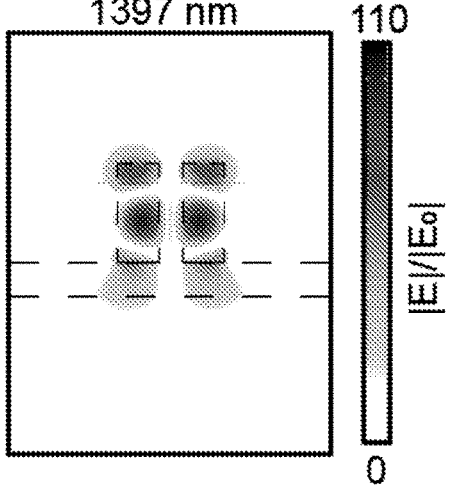

We introduce a high quality factor mode by inserting 10 nm by 200 nm long perturbations into both silicon bars. Here 402 is the perturbation as described above. FIG. 4A shows the top-down view of the supercell describing the geometry. The period of 710 nm allows incident light to couple to guided mode resonances near 1400 nm, which we confirm in FIG. 4B. Here, a resonant decrease in the ±1 diffraction orders at 1397 nm occurs within a resonance with extracted Q~28,000. There is also a marked increase in the directly transmitted light (0th order). Consistent with our design, on resonance, we additionally observe resonant amplification of light within the nanoantennas. FIG. 4C shows field enhancements approaching 110 on resonance, with the field additionally leaking into the lithium niobate.

Figure 4D:
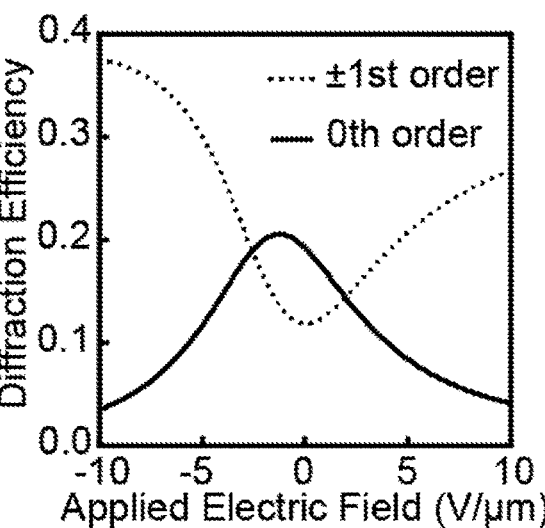

As with the reconfigurable beamsteerer, we apply a uniform electric field in the +x direction to observe the electrooptic response. Operating at 1397 nm, we clearly see in FIG. 4D that the diffraction can be tuned with an electric field. The contrast is lower than that in the beamsteering example, but there is, nevertheless, a strongly observable signal that can be modulated on or off with the electric field.

Figure 4E:
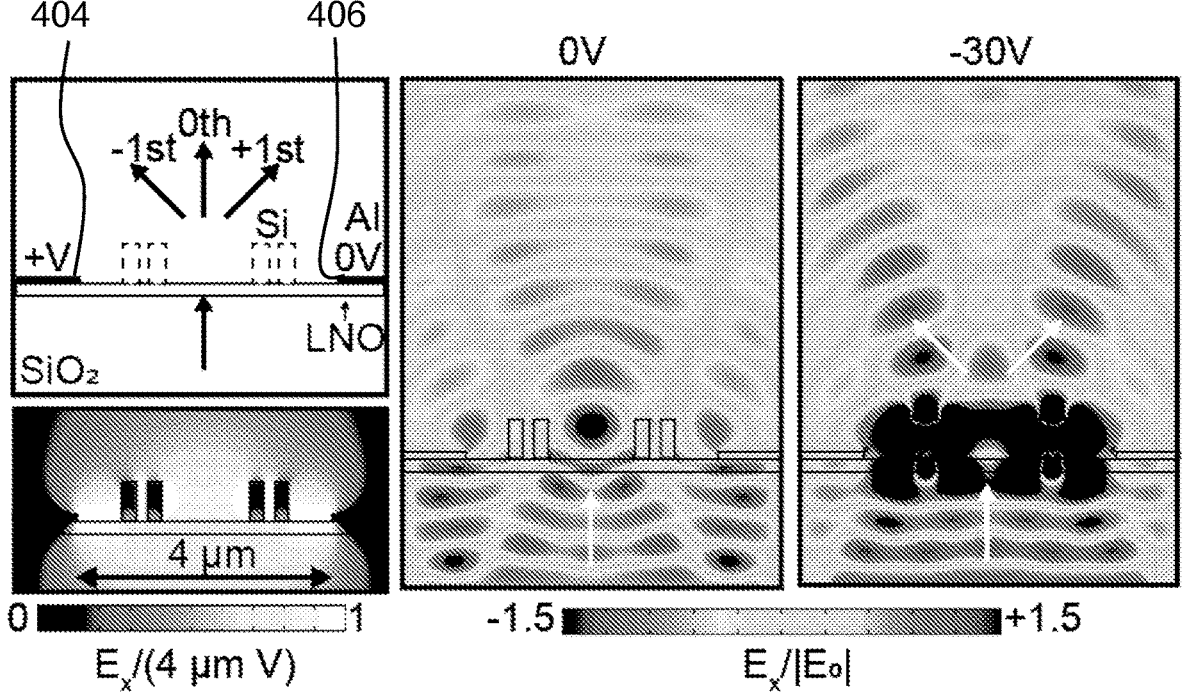

To demonstrate the practicality of our design, we perform coupled simulations in a realistic device design. First, we choose to operate with only 2 supercells, a finite sized device that is close to previously demonstrated finite-sized metasurfaces. This further allows the Aluminum contacts to be placed in close proximity, decreasing the required applied voltage. The contacts (404, 406 on FIG. 4E) are applied laterally and spaced with a distance of 4 μm, acting as both an aperture and a biasing mechanism. We simulate this structure by first determining the local, spatially varying, electric field profile when a voltage difference of 1 V is applied to the contacts. Then, we perturb the refractive index of lithium niobate using Eqs. (B1) and (B2), linearly adjusted as a function of desired voltage. The contacts are applied such that the dominant electric field direction is in the x-direction, consistent with the previous, infinitely periodic, simulations. The local description of the electric field, therefore, defines a spatially dependent refractive index that would be observed in experiment. Finally, we simulate the scattering properties for a wave incident from below and record the AC optical field exiting the metasurface. A schematic of the device design and uniform DC electric field distribution is shown in the left panel of FIG. 4E.

Operating at 1397 nm and with no applied voltage (FIG. 4E, center), we observe no discernable beamsplitting. The simulated transmitted power is approximately 47%, similar to the expected value in FIG. 4B (50%). However, applying a voltage of 30 V (FIG. 4E, right), we clearly observe beamsplitting in the far field. Here, two general lobes transmit at equivalent but opposite angles relative to the incident direction (i.e., to the +1 and −1 orders). Further, the field intensity drops off significantly in the direct (i.e., 0th) order direction, meaning that most of the power incident on the material is not directly transmitted. The transmitted power (76%) is similar to the value in FIG. 4B (78%) at −7.5 V/μm. The difference likely comes from the metasurface's finite size and finite illumination, leading to unintended diffraction of the input beam. This fully rigorous calculation demonstrates that electro-optic modulation can be used in finite size metasurfaces at reasonable voltages. We note that the required frequency shift, and hence, required voltage, in these designs is dictated by Q. For a lower applied voltage, a design with a higher Q can be used. Modifying the gate geometry or mode overlap with the electro-optic material can further reduce the required voltage.

We have shown in this work that electro-optic modulation is a simple scheme to realize reconfigurable optics in phase gradient metasurfaces. Using full-field coupled simulations, we have shown directly that highly resonant metasurface elements can be efficiently modulated with schemes that can, in principle, operate at high speeds, potentially useful in future sensing and communication platforms. Modifying the gate geometry and electro-optic mode overlap could realize highly efficient, subwavelength, and individually address-able phase pixels for fully dynamic metasurfaces. Finally, we have performed simulations where the metasurface element is LNO to push the designs to the visible and to increase the mode overlap with the electro-optic material. The design methodology presented here, thus, represents a general route to transfer function modulation in subwave-length footprints, an enabling technology in the design of lightweight, reconfigurable, and efficient wavefront shaping devices.

C) Example 2—Electro-Optically Reconfigurable High-Q Tunable Metasurfaces

C1) Introduction

The ability to deterministically shape and control wave-fronts is essential for optical technologies spanning com-munication, computation, and sensing. Lightweight, com-pact, and mobile platforms are especially important, and in the past decade, have been accelerated by advances in metasurfaces. These ultra-thin surfaces are composed of subwavelength antennas that precisely control the phase, polarization, and amplitude of transmitted or reflected light. Utilizing geometric patterning, the optical response of meta-surfaces can be tailored to realize beamsteering, lensing, and holography, among other transfer functions, each in a sub-wavelength-thick platform with comparable performance to bulk optics.

While traditional passive metasurfaces are limited to performing a specific application predetermined by their architecture, reconfigurable metasurfaces dynamically change their optical wavefront. A variety of modulation techniques have been explored, including electro-optic, thermo-optic, mechano-optic, and nonlinear effects in mate-rials. Among these, electrical tuning is the only reasonable approach for incorporation into near-term commercial devices and has been shown to be particularly promising for fast modulation, utilizing liquid crystals, MEMS, the elec-tro-optic Stark effect, epsilon-near-zero materials, or tuned carrier concentration. Of particular interest is the ability to individually address metasurface pixels; recent advances here have resulted in reconfigurable wavefront shaping devices capable of multiple transfer functions, including tunable beamsteering and lensing. However, device efficien-cies remain poor, with high absorption loss, low diffraction efficiency (<50% for transmissive devices and <10% for reflective) and low spatial resolution of the constituent nanoantennas, limiting fields of view to less than 45°).

Here we demonstrate a fully reconfigurable silicon-on-lithium niobate metasurface capable of high overall effi-ciency and high accuracy wavefront shaping, with a large dynamic tuning range. Our design leverages high quality factor (high-Q) nanoantennas to arbitrarily control the phase response of each antenna, which we individually address through transparent conducting oxide contacts on each antenna. With the ability to individually address metasurface elements, we can construct phase gradient transfer functions defined by the applied field, rather than varying the size, spacing, or geometry of the constituent nanoantennas. By changing the nanoantenna biasing configuration, we show a single metasurface can be tuned to steer light to different angles with high diffraction efficiency. We further demon-strate how our metasurface can switch between multiple transfer functions through coupled electrostatic and electro-magnetic full field finite element simulations. Specifically, we show how an applied field can modulate the metasurface to act as beamsplitting or beamsteering devices. In beam-steering, we demonstrate reconfigurability up to 51°, corre-sponding to a 102° field of view, with an efficiency of 93%. As a beam-steerer, we show how biasing can result in diffracted angles spanning 18-31° with efficiencies as high as 86%.

C2) Design of Electro-Optically Tunable High-Q Metasur-face

Figures 5A, 5B:
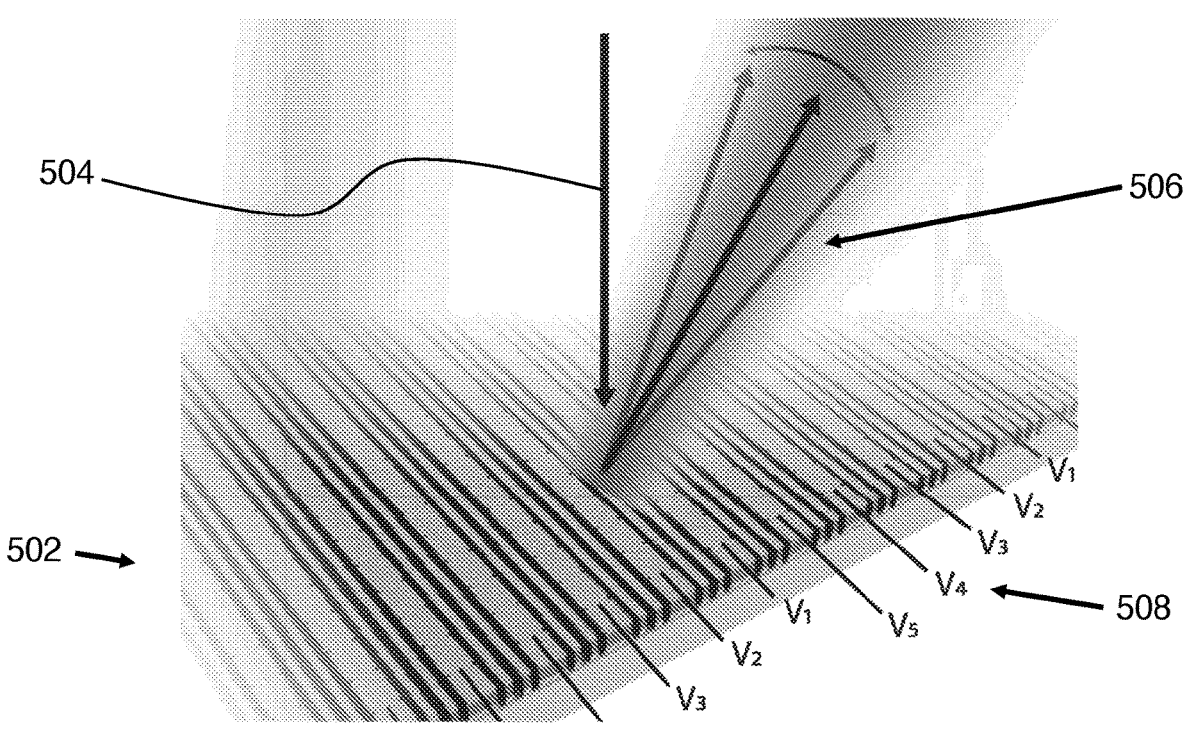

FIG. 5A illustrates our device design. The metasurface 502 is constructed from a series of identical nanobars of etched silicon-on-lithium niobate, which serve as our nano-antennas to control the optical phase and resulting transfer function from free space optical input 504 to free space optical output 506. As seen in FIGS. 1B-C, the nanobars 510 are 500 nm wide across the 220-nm-thick Si layer. Beneath the Si is 100-nm-thick x-cut LNO, etched with a 10° taper angle, commensurate with fabrication constraints. The high index of Si localizes light and serves as a waveguide, while the LNO is used as the active, electro-optic material. The thickness of Si was selected to enhance the modal overlap in the active LNO layer by promoting otherwise tightly confined modes to leak out of the Si. Similarly, the thickness of LNO was selected to encapsulate the spatial extent of the leaked high-Q mode, while minimizing the distance between the electrostatic contacts. Our electrostatic contacts were two 50 nm layers of transparent conducting oxide (TCO), here modeled as indium tin oxide (ITO), on top of the Si and beneath the LNO. Maintaining minimal distance between the electrical contacts raises the resulting electrostatic field intensity experienced by the nanoantenna. The ITO top contact is etched the same width as the Si, while the bottom contact is unetched and acts as the ground. Thus individual control voltages 508 can be applied to each of the nanobars of the metasurface.

The center-to-center distance of the nanobars is 1000 nm, chosen to significantly separate the resonators to decrease coupling while also maintaining the subwavelength nature of each metasurface unit cell "pixel". Two additional nanofins 514, 516 with 100 nm width are included on either side of the nanobars to act as isolators between nanobars to suppress coupling and voltage crosstalk, ensuring the high-Q modes operate independently from one another while maintaining subwavelength separation. The device operates in reflection with the addition of a metallic layer (in this case gold), beneath an insulating layer of silicon dioxide (SiO₂); we position the gold reflector 610 nm below the bottom contact, far enough away to reduce absorption while also maximizing reflection. FIG. 5B includes the geometry of the metasurface unit cell, including the nanobar resonator and two nanofin isolators.

Figure 5D:
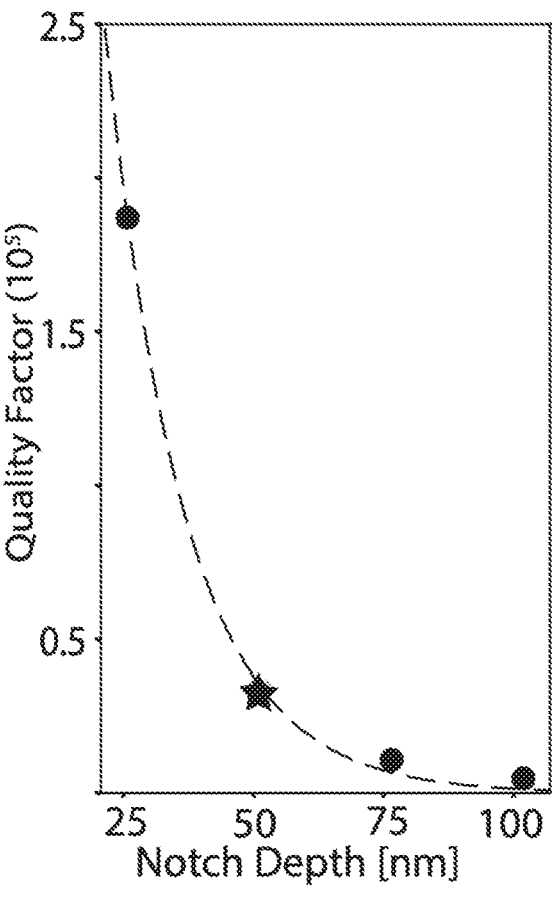
FIG. 5D shows the dependence of resonance quality factor on perturbation notch depth for the example of FIG. 5A.

The introduction of periodic notches into each nanobar induces a high-Q resonance in the form of a guided mode resonance (GMR). It is well known that Si waveguides support guided modes due to high index contrast. Applying a periodic perturbation to the waveguide provides additional momentum that allows the guided modes to couple to a normally incident external field. Such GMRs arise from the imposed Bloch condition on the waveguide dispersion from the periodic perturbations. These GMRs are accompanied by highly enhanced near fields and long resonant lifetimes, and embedded into metasurfaces, enable efficient nonlinear and dynamic metasurfaces. We select a notch period of 650 nm to introduce a resonance at approximately 1565 nm. FIG. 5C shows the symmetric pair of notches 512, 100 nm wide and 50 nm deep. The size of the notch influences the guided mode resonance radiative coupling strength, with shallower notches resulting in higher Q factors, as shown in FIG. 5D (COMSOL Multiphysics).

Figure 5E:
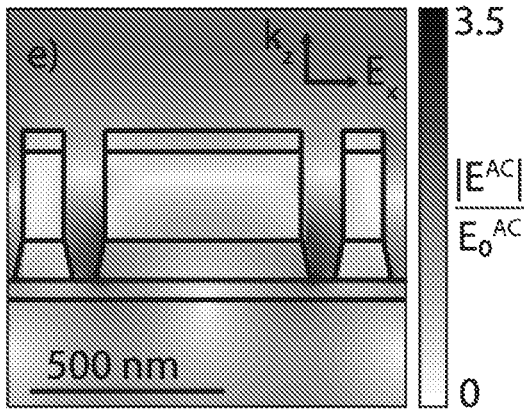
FIGS. 5E-F show off-resonance and on-resonance field profiles for the example of FIG. 5A.
Figure 5F:
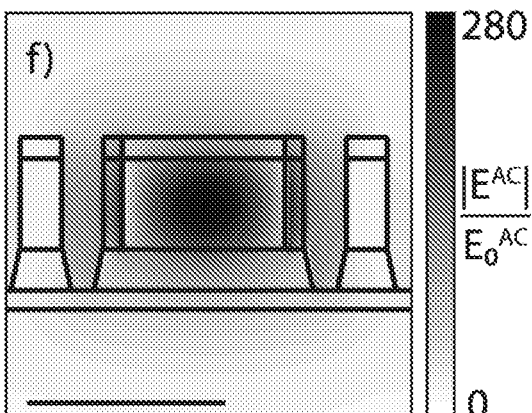
Figure 5G:
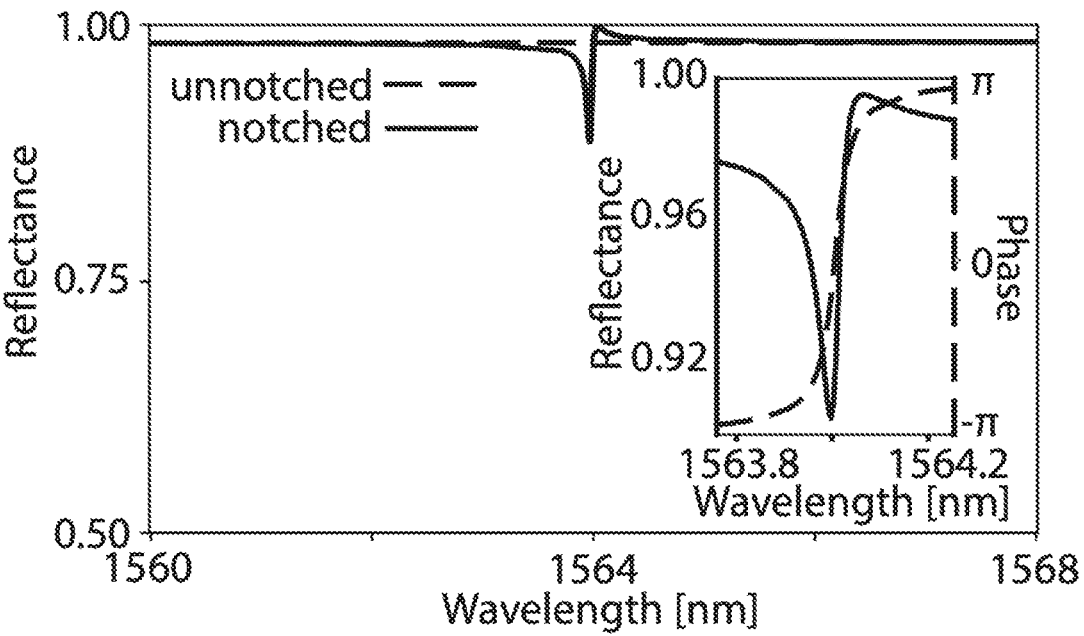
FIG. 5G shows the reflectance spectra of notched and unnotched structures for the example of FIG. 5A.

FIGS. 5E-F show the optical electric field distribution for the low-Q unnotched (FIG. 5E) and high-Q notched (FIG. 5F) cases of our metasurface design when illuminated by light with an x-polarized electric field incident from the z-direction. The highly resonant high-Q structured metasurface enhances the electric field by up to 250× in the Si and 82.8× in the LNO compared to the non-resonant case. The reflection spectrum of our metasurface is depicted in FIG. 5G. For the nanobar structure with no perturbations, we observe generally high reflection greater than 98% across the wavelength range. When periodic perturbations are included, we observe a resonant dip in the reflection to approximately 91%, with a Q factor exceeding 33,000.

In addition to the high efficiency reflection, the high quality factor resonance is accompanied by a $2\pi$ phase variation in the reflected light. Such a full $2\pi$ phase space allows for nearly any transfer function to be constructed—ranging from simple beamsplitters and beamsteerers to more complex systems such as lenses and holograms. We utilize the electro-optic effect in the LNO layer to individually address each nanobar "pixel". Here, a DC applied field in the appropriate direction modifies the LNO permittivity according to:

$$\Delta\epsilon_{xx} = -r_{33}n_e^4 E_{z,app} \tag{C1}$$

$$\Delta\epsilon_{yy} = \Delta\epsilon_{zz} = -r_{13}n_0^4 E_{z,app} \tag{C2}$$

Figure 6A:
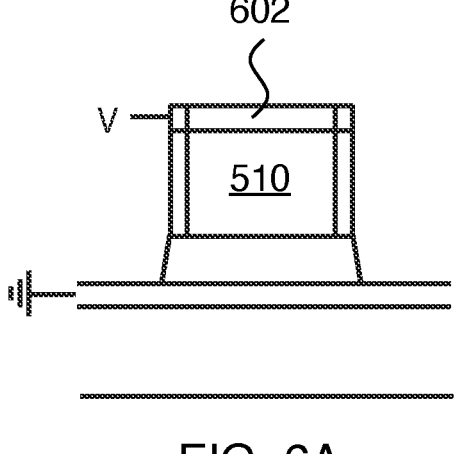
FIG. 6A show the per-element electrical biasing scheme of the example of FIG. 5A.
Figure 6B:
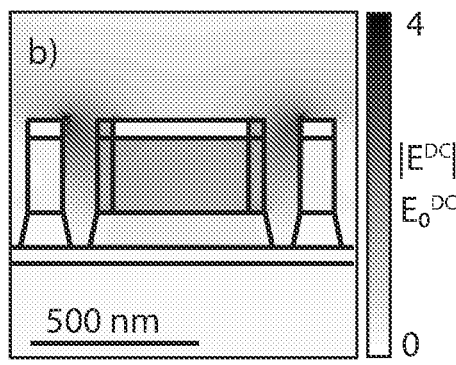
FIG. 6B shows an exemplary electric field distribution from electrical biasing as in FIG. 6A.

Here, $r_{13}=9$ μm/V, and $r_{33}=31$ μm/V are the LNO electro-optic coefficients, $n_0=2.21$ and is the ordinary refractive index of LNO, and $n_e=2.14$ and is the extraordinary refractive index of LNO. $E_{z,app}$ is the electric field applied with the voltage bias across the TCO contacts. In our metasurface design, this bias is achieved by applying a voltage to the TCO layer 602 above a given nanobar 510, as shown schematically in FIG. 6A. The electrostatic DC field resulting from applying 1V to the top contact is shown in FIG. 6B. The high DC relative permittivity of LNO ($\epsilon_{11,DC}=46.5$, $\epsilon_{33,DC}=27.3$) results in a decreased applied DC electric field strength in the LNO layer, where the electric field is about four times stronger in the Si than the LNO. We compensate for this by minimizing the distance between the TCO contacts to increase the overall electric field.

Figure 6C:
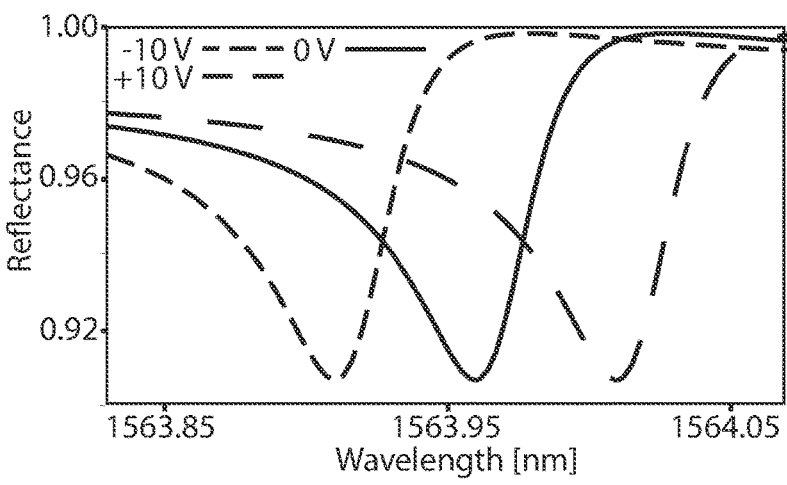
FIG. 6C shows the spectral dependence of the resonance on applied bias.
Figure 6D:
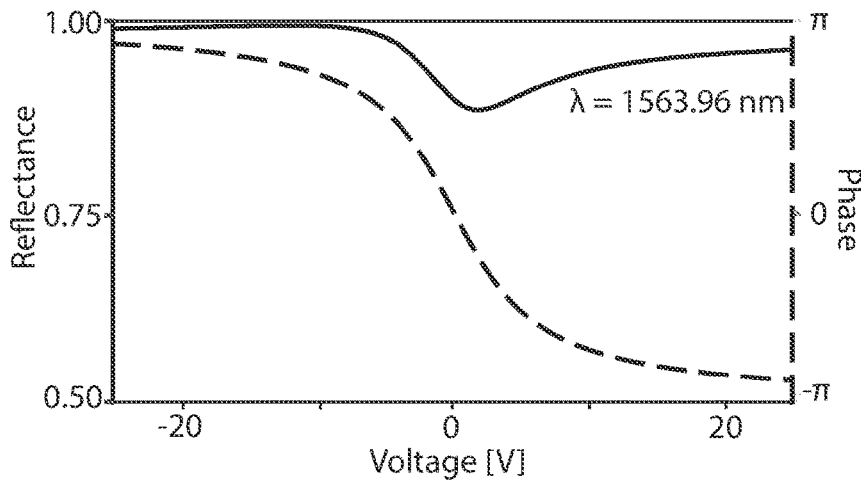
FIG. 6D shows the dependence of reflectance (amplitude and phase) on applied bias at a fixed operating wavelength.

Since high-Q resonances are very sensitive to subtle changes in refractive index, even small changes associated with otherwise weak electro-optic effects tune the device at reasonable voltages. FIG. 6C shows spectral shifts of the high-Q resonance for ±4.7 V. As seen, the resonance redshifts with positive applied bias and blue shifts with negative applied bias. This shift is accompanied by changes to the phase and amplitude of the reflected light at the unbiased resonant wavelength, λ=1563.96 nm, shown in FIG. 6D. Our high-Q resonance changes its spectral position by a full linewidth with biases of ±25 V, allowing us to achieve full $2\pi$ phase tunability of individual nanoantennas with reasonable applied electric fields. We note that the required voltage could be further reduced by increasing Q or increasing the optical and DC field overlap in the LNO.

Figure 7A:
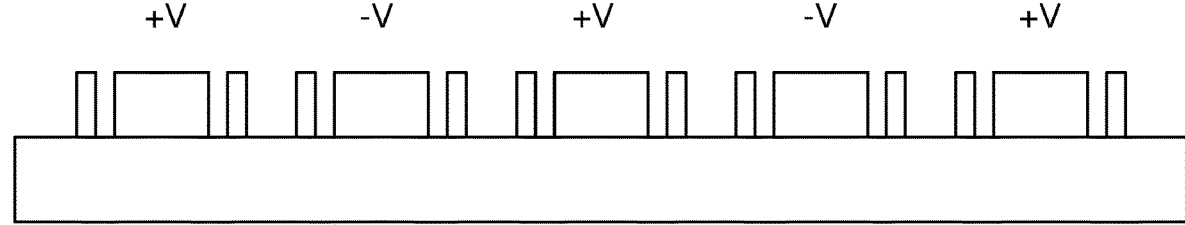
FIG. 7A shows a first exemplary biasing configuration.
Figure 7B:
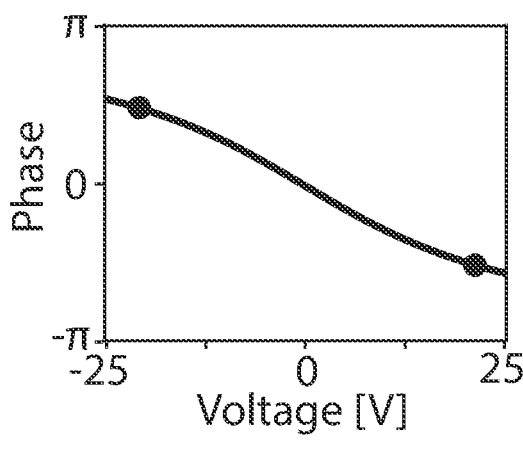
FIGS. 7B-D show results for the biasing configuration of FIG. 7A without isolating structures between the resonant waveguides of the metasurface.
Figure 7C:
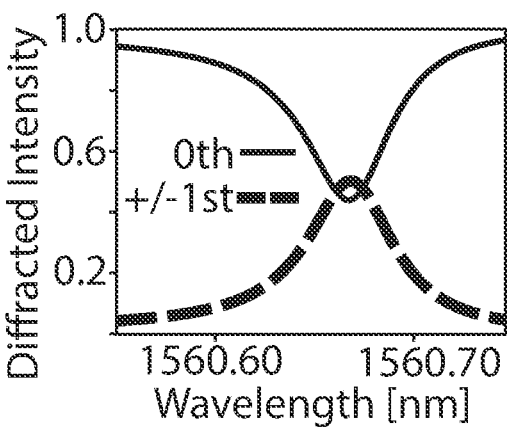
Figure 7D:
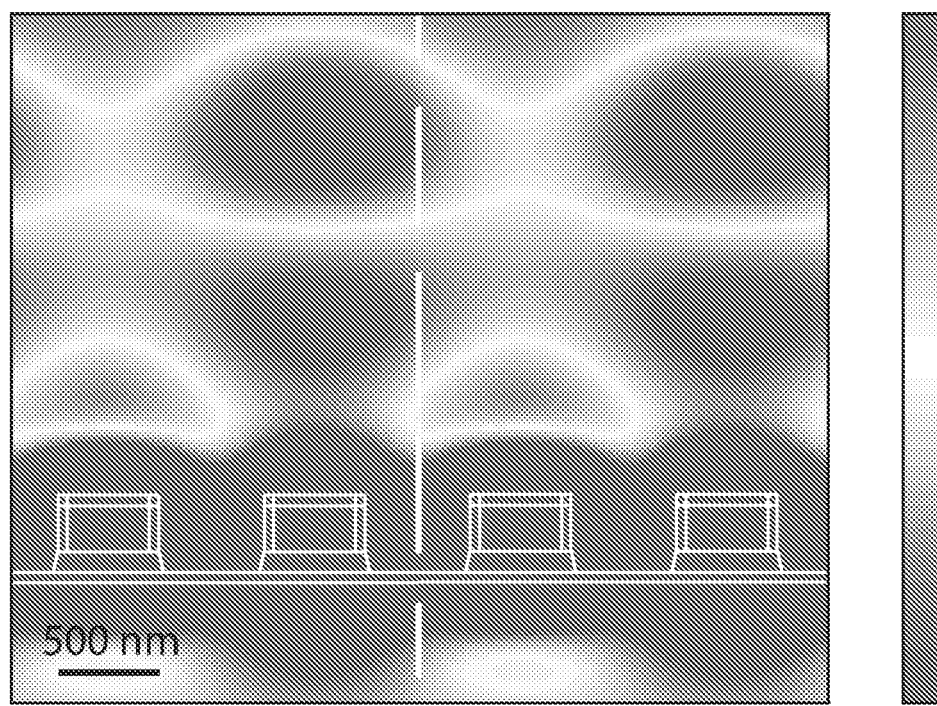
Figure 7E:
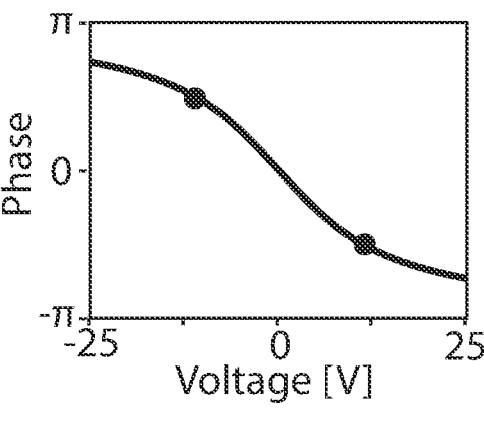
FIGS. 7E-G show results for the biasing configuration of FIG. 7A with isolating structures between the resonant waveguides of the metasurface.
Figure 7F:
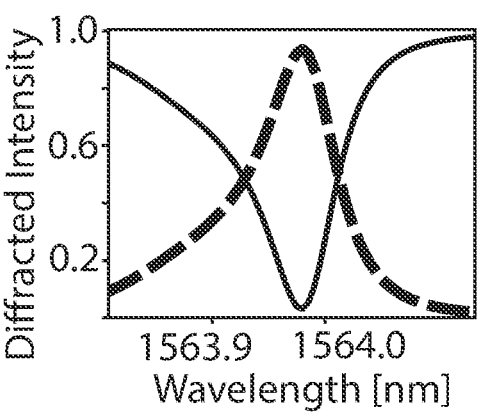
Figure 7G:
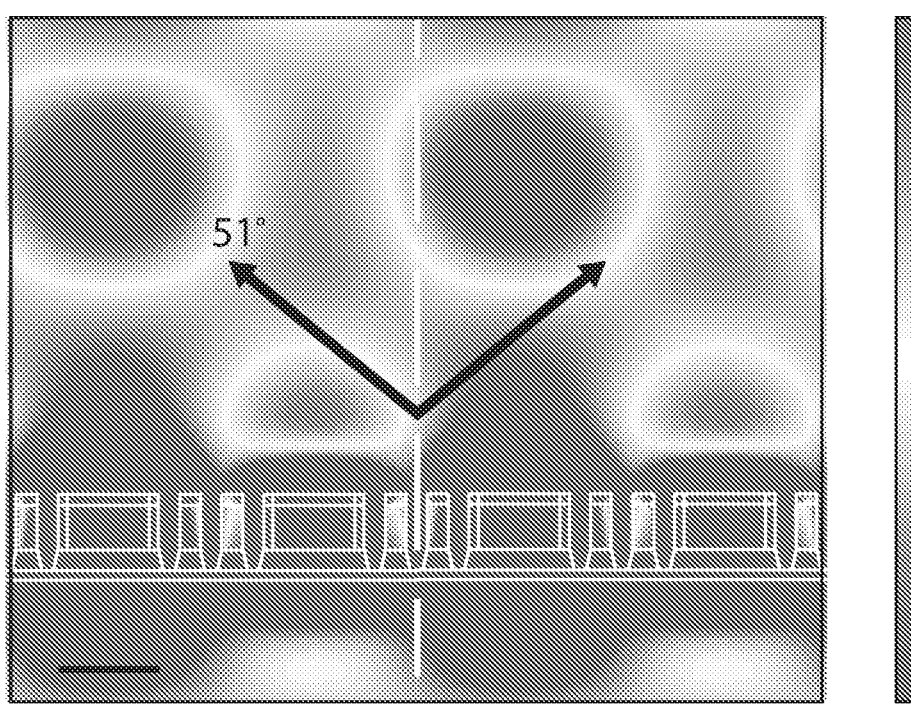

C3) Numerical Demonstration of Electro-Optic Beamsplitting and Tunable Beamsteering FIG. 7A shows the design of a switchable beamsplitter, which we construct from a pair of nanoantennas resonating $\pi$ out of phase of one another. By applying alternating biases to every other nanobar, schematically shown as a supercell of 2 nanobars in FIG. 7A, we electro-optically shift the phase delay of neighboring nanobars $\pi$ out of phase of each other. FIG. 7B shows the resulting phase versus voltage for nanoantennas without nanofins between them; at voltages of ±21 V, we achieve a phase delay difference of $\pi$ at the resonant wavelength 1562.65 nm. Without nanofins, the application of these voltages to alternating nanoantenna results in a ±1st combined diffraction efficiency of only 49%, as seen in FIG. 7C and the field plot of FIG. 7D. In contrast, when nanofins are included to properly isolate the high-Q modes from one another, significant beamsplitting can be observed (FIGS. 7E-F). First, we note that the addition of nanofin isolators does not affect the metasurface's behavior without bias, apart from the resonance being shifted slightly to 1563.96 nm. The inclusion of nanofins changes the phase response with applied voltage (FIG. 7E), and we therefore utilize ±11.3 V for our beamsplitting condition, as illustrated in FIG. 7E. In this case, the ±1st diffraction order achieves 93% combined efficiency on resonance at 1563.96 nm (FIG. 7F). This higher efficiency corresponds to clear beamsplitting in the field plot in FIG. 7G, where light is directed to ±51.4° off normal. Put otherwise, by carefully engineering high-Q resonances, maintaining their isolation with additional nanostructures, and applying particular voltage biases, we are able to freely construct a dynamically switchable beamsplitter.

Next, we demonstrate how this platform enables beamsteering with dynamically tunable angle control. A beamsteerer is constructed by a linear phase gradient spanning $2\pi$ over the metasurface supercell. Incident light is reflected at an angle $\theta_r$ determined by:

$$\theta_r = \arcsin\left(\frac{\lambda_0}{n_i p} + \sin(\theta_i)\right) \tag{C3}$$

where, $\lambda_0$ is the incident wavelength, $\lambda_i$ is the refractive index of the incident medium, p is the supercell size, and) $\lambda_i$ is the incident angle. In our metasurface design, each supercell has an integer $\lambda$ number of nanobars within it. Therefore, we look for applied field configurations that give neighbor-to-neighbor phase variation of:

$$\Delta\phi = \frac{2\pi}{n} \tag{4}$$

Figures 8A, 8B, 8C, 8D:
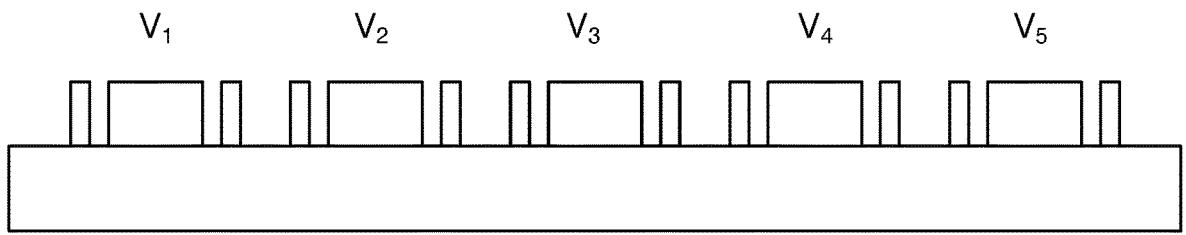
FIG. 8A shows a second exemplary biasing configuration.
FIGS. 8B-D show results for the biasing configuration of FIG. 8A with a 3-element phase gradient.

FIG. 8A schematically illustrates one possible supercell of nanobars each with a different applied voltage. By changing the number of bars in the supercell period, and thus the size of the supercell period, we control the beamsteering angle operating at the resonant frequency.

Figure 8E:
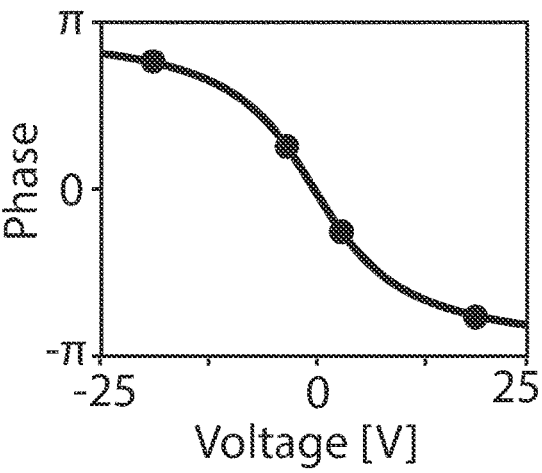
FIGS. 8E-G show results for the biasing configuration of FIG. 8A with a 4-element phase gradient.
Figure 8F:
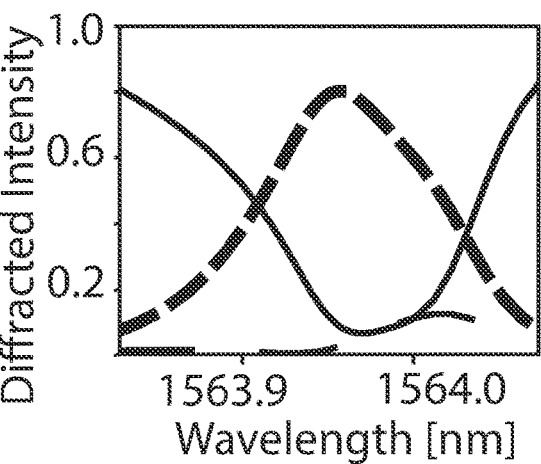
Figure 8G:
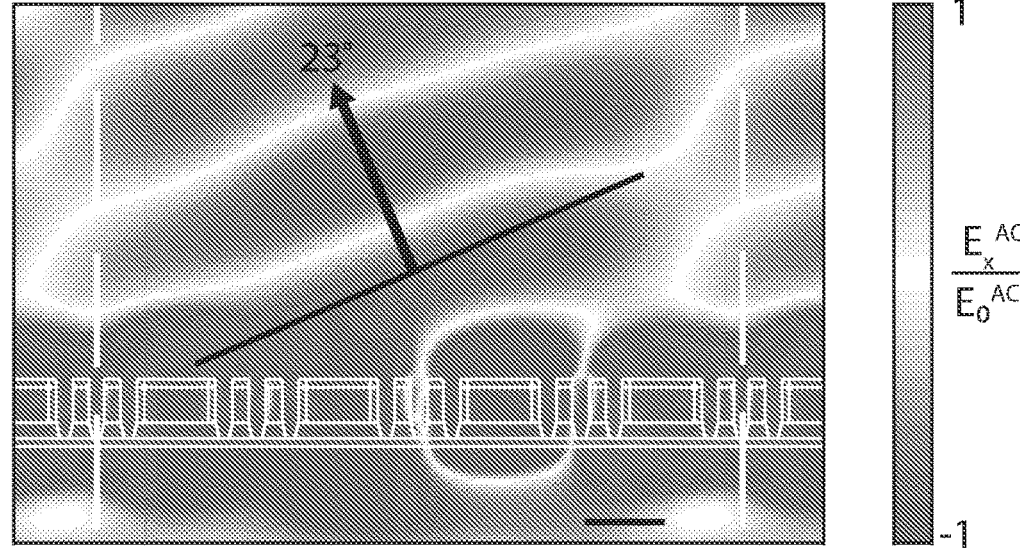
Figure 8J:
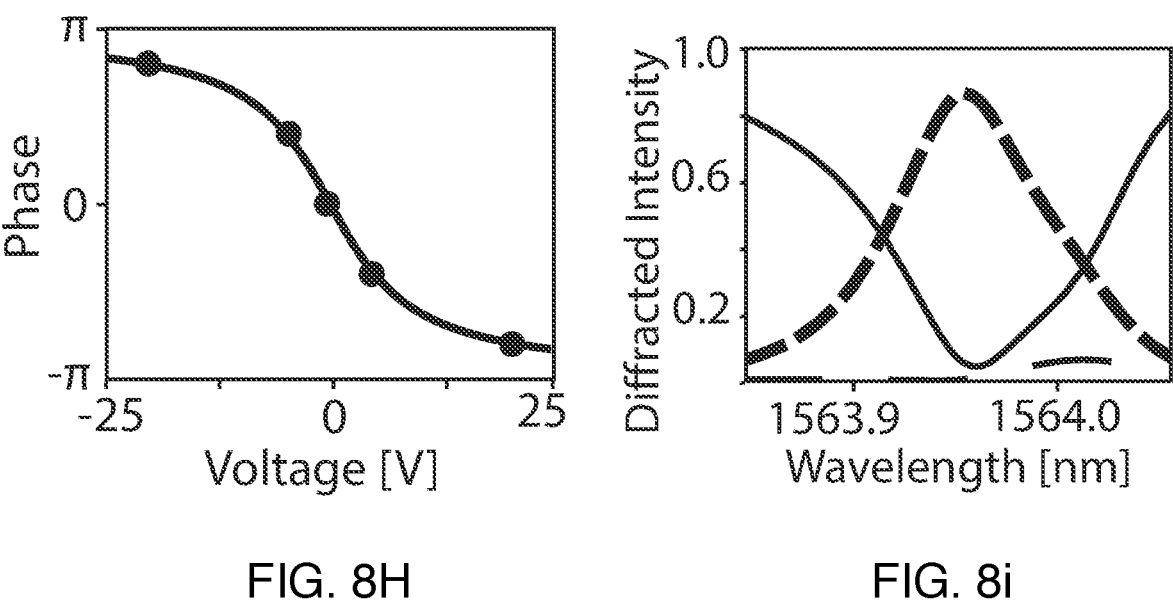
Figure 8J:
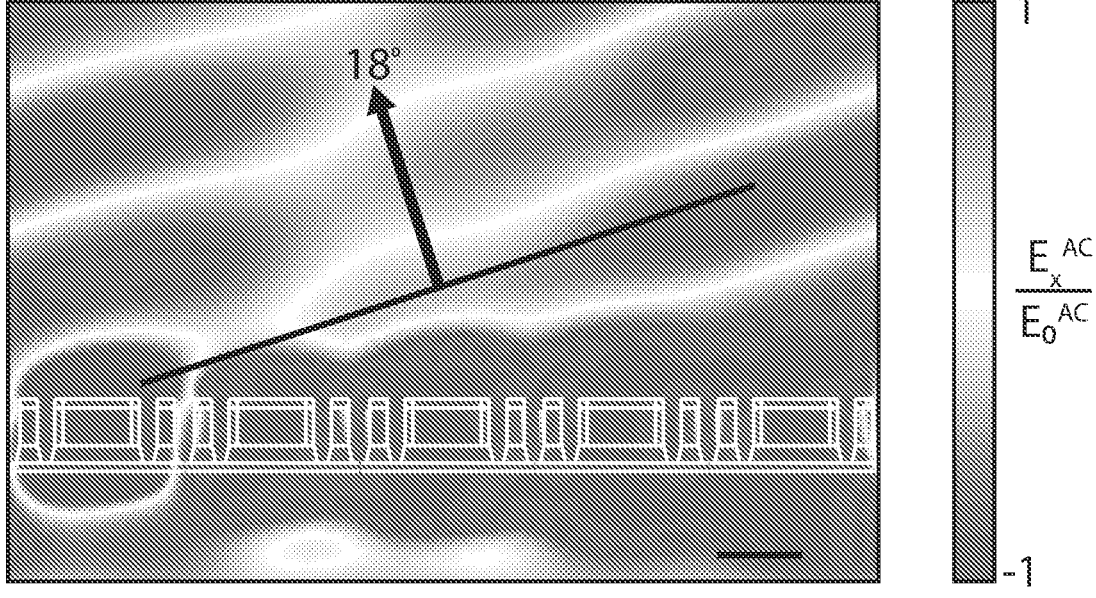

We show how our metasurface can form a tunable beamsteerer by modifying the biasing period of our device. For example, we can use supercells composed of 3 (FIGS. 8B-D), 4 (FIGS. E-G), or 5 (FIGS. 8H, 8i, 8J) biasing supercell periods to dynamically change the steering angle. We choose voltages applied to individual bars within the supercell that introduce the desired linear phase variation for each beamsteering direction, using 31°, 23°, and 18° as example angles (FIGS. 8B, 8E, 8H). This corresponds to a difference in phase response between neighboring antennas of $$\frac{2\pi}{3}, \frac{2\pi}{4}, \text{ and } \frac{2\pi}{5}$$

for the 3, 4, and 5 bar supercells respectively. FIGS. 8C, 8F, 8i show the calculated reflection into each potential diffraction order, showing high efficiency at the design wavelength (1563.96 nm). Specifically, we demonstrate beamsteering efficiencies of 76%, 80%, and 86%, respectively, as shown by the preferential diffraction to the +1st order. FIGS. 8D, 8G, 8J show the electromagnetic field resulting from metasurface operating at 1563.96 nm when (FIG. 8D) three, (FIG. 8G) four, and (FIG. 8J) five voltages are applied; white dotted lines denote the supercell period in FIG. 8D and FIG.

8G. All scale bars are 500 nm. Our high-Q nanoantennas, with Q>30,000, allow strong and tunable beamsteering with just a few volts applied to most elements. The required bias voltages can be further reduced by increasing the Q, though we note an increased sensitivity to coupling will eventually force a trade-off between biasing efficiency and resolution.

We note that this principle can be extended to a broader angle range by increasing the number of bars in the phase gradient, and thus the supercell period. With a single metasurface design, light can be steered to a specific set of angles determined by the period lengths formed by the number of biases in the supercell. To increase the set of angles that can be accessed, the bar width and spacing can be altered. As such, continuous beamsteering could be achievable through a series of diffractive metasurfaces integrated into a single device.

More specifically, pixelating metasurfaces on a single chip can further enhance the functionality of our tunable metasurface-based devices. In a single metasurface, the number of voltages applied, and thus the number of bars in a supercell period, determine the beamsteering angle. The possible beamsteering angles are determined by the unit cell dimensions of the metasurface. When metasurfaces are pixelated, adjacent pixels can have different unit cell widths resulting from tuning the bar width or spacing to achieve the desired dimensions. This allows each metasurface pixel to access a different set of beamsteering angles, e.g., as shown in FIG. 9, enabling near-continuous beamsteering in a single metasurface-based device.

C4) Conclusion

In summary, we have demonstrated a metasurface design that individually tunes high-Q resonances in subwavelength nanoantennas for reconfigurable and highly efficient wavefront shaping. Using full-field coupled simulations, we demonstrate that the electro-optic effect in LNO can be used to control the spectral position of a resonance, and thus its accompanying phase delay. With our Si-on-LNO platform we achieve nearly $2\pi$ phase variation without sacrificing device efficiency. By modulating the applied electric field profile, we can fully reconfigure our metasurface to act as a beamsplitter or as a beamsteering structure whose steering angle can be dynamically changed with high efficiency (93% in beamsplitting and 86% in beamsteering). Moreover, this metasurface design is widely generalizable to other transfer functions, as it can generate any arbitrary phase profile, such as a hyperboloid for future reconfigurable lensing and other non-periodic series. Additionally, a variation of this platform could be explored in transmission through amplitude tuning rather than phase. Our metasurface platform provides a foundation for a multitude of spatial light modulation devices using nanoscale components capable of shaping light as desired.

The invention claimed is:

1. Apparatus comprising:
   an electromagnetic metasurface including two or more waveguides disposed on a surface;
   wherein each of the two or more waveguides supports one or more guided modes;
   wherein each of the two or more waveguides has a corresponding longitudinal perturbation, whereby at least one guided mode resonance is supported in each of the two or more waveguides;
   wherein free-space radiation is coupled to a selected two or more of the guided mode resonances by the longitudinal perturbations of the two or more waveguides;
   wherein the selected two or more of the guided mode resonances are tunable according to at least one tuning input, whereby a free-space response provided by the electromagnetic metasurface is tunable.

2. The apparatus of claim 1, wherein the at least one tuning input includes an independent tuning input for each of the two or more waveguides.

3. The apparatus of claim 1, further comprising at least one tuning element, wherein the electromagnetic metasurface is disposed on or embedded within the at least one tuning element, and wherein the at least one tuning input varies a physical property of the at least one tuning element.

4. The apparatus of claim 1, wherein the tuning input varies a parameter selected from the group consisting of: physical properties of the longitudinal perturbations and physical properties of the waveguides.

5. The apparatus of claim 1, wherein the selected two or more of the guided mode resonances each have a quality factor of 100 or more.

6. The apparatus of claim 1, wherein the surface is selected from the group consisting of: planar surfaces, curved surfaces, and surfaces on flexible materials.

7. The apparatus of claim 1, wherein the free-space response is selected from the group consisting of: beam steering, focusing, phase modulation, amplitude modulation, spatial light modulation, and amplitude and phase modulation.

8. The apparatus of claim 1, wherein the free-space response is selected from the group consisting of: reflection response and transmission response.

9. The apparatus of claim 1, wherein an operating wavelength of the electromagnetic metasurface is in a range from 400 nm to 2000 nm.

10. The apparatus of claim 1, wherein at least one of the longitudinal perturbations is periodic.

* * * * *